(12) United States Patent
Murayama et al.

(10) Patent No.: US 6,352,139 B1
(45) Date of Patent: Mar. 5, 2002

(54) INDEXABLE SPINDLE LOCKING DEVICE

(75) Inventors: Shinichi Murayama, Fukushima; Takahiro Nakamura, Fukui, both of (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 09/425,212

(22) Filed: Oct. 22, 1999

(30) Foreign Application Priority Data

Oct. 27, 1998 (JP) .......................................... 10-305264

(51) Int. Cl.[7] .............................................. F16D 63/00
(52) U.S. Cl. ...................... 188/68; 188/71.4; 188/72.3; 188/72.4; 188/367
(58) Field of Search ................................ 188/72.3, 72.4, 188/72.6, 367, 368, 369, 370, 265, 68, 69, 71.4

(56) References Cited

U.S. PATENT DOCUMENTS

| | | | | | |
|---|---|---|---|---|---|
| 1,843,490 A | * | 2/1932 | Spase | ......................... | 188/72.3 |
| 1,953,575 A | * | 4/1934 | Oberstadt | ................... | 188/71.7 |
| 2,044,989 A | * | 6/1936 | Brie | ............................ | 188/72.4 |
| 2,115,083 A | * | 4/1938 | Pierce | ......................... | 188/370 |
| 2,376,685 A | * | 5/1945 | Goepfrich | ................... | 188/369 |
| 2,924,301 A | * | 2/1960 | Durst et al. | ................. | 188/72.3 |
| 2,924,302 A | * | 2/1960 | Black | ......................... | 188/72.3 |
| 3,048,242 A | * | 8/1962 | Perks | ......................... | 188/72.6 |
| 3,680,663 A | * | 8/1972 | Kine | .......................... | 188/72.6 |
| 4,057,297 A | * | 11/1977 | Beck et al. | ................. | 188/72.3 |

FOREIGN PATENT DOCUMENTS

JP  A-8-112703  7/1996

* cited by examiner

*Primary Examiner*—Matthew C. Graham
*Assistant Examiner*—Thomas J. Williams
(74) *Attorney, Agent, or Firm*—McDermott, Will & Emery; Paul Devinsky

(57) ABSTRACT

A locking device (10) for an indexable spindle (1) to which a tool electrode is attached, comprises a brake disk (2) fixed to the spindle, an annular upper brake member (11) movable in the axial direction of the spindle between a first position and a second position closer to the brake disk than the first position, a annular lower brake member (13) movable in the axial direction of the spindle between a third position and a fourth position closer to the brake disk than the third position, an upper disk (21) arranged facing upper surface of the brake disk across a minimum gap when the upper brake member is at the first position, a lower disk (22) arranged facing lower surface of the brake disk across a minimum gap when the lower brake member is at the third position, and drive means for moving the upper and lower brake members in the axial direction of the spindle. When the upper brake member is at the second position and the lower brake member is at the fourth position, the upper and lower brake members press the upper and lower disks against the brake disk to lock the spindle.

11 Claims, 5 Drawing Sheets

F I G. 1
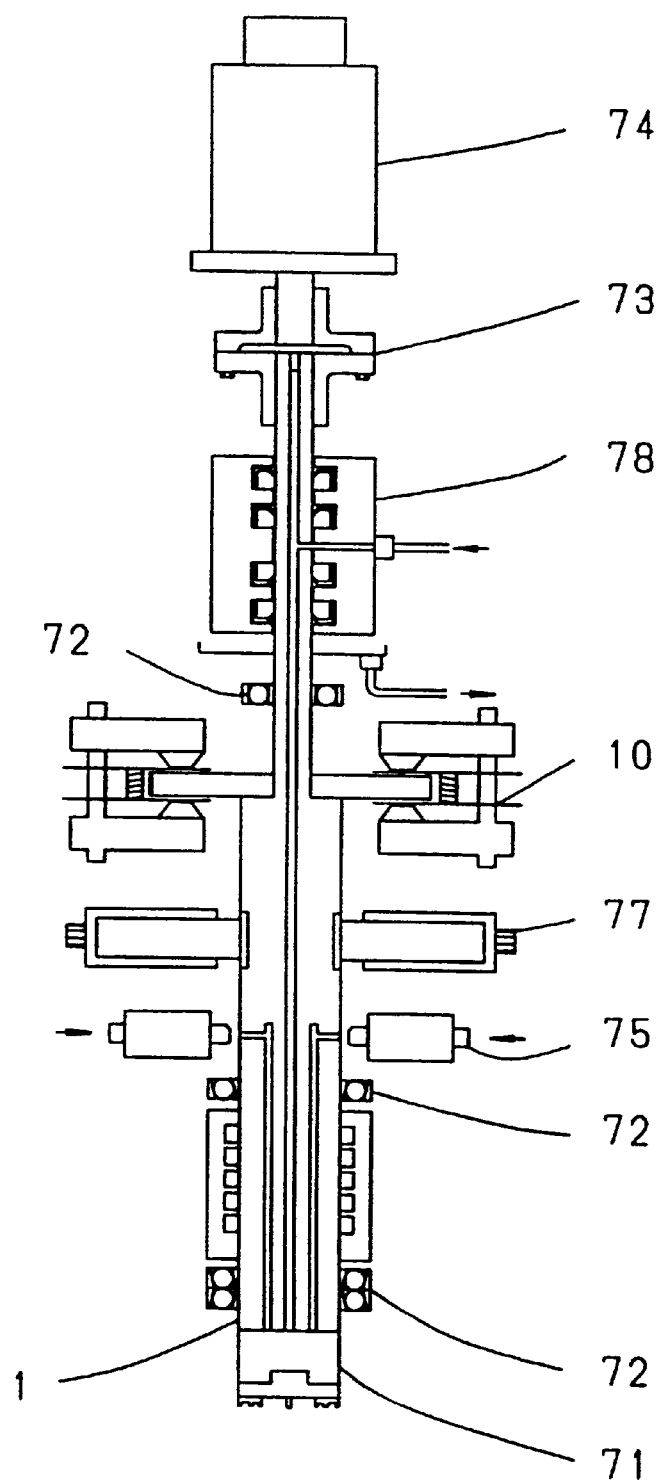

INDEXABLE SPINDLE LOCKING DEVICE

FIELD OF THE INVENTION

The present invention relates to an electric discharge machine to accurately index the rotation angle of a spindle to which a tool electrode is attached. More particularly, the present invention relates to a locking device for locking a spindle of an electric discharge machine.

BACKGROUND OF THE INVENTION

In many cases electric discharge machines are used to shape a workpiece into a high precision mold by generating electric discharges between a tool electrode and the workpiece. Generally, a spindle to which the tool electrode is attached moves in the direction of a Z-axis, while a table to which the workpiece is fixed moves in a plane defined by an X- and Y-axis. Electric discharge machines that can accurately specify the rotation position of a spindle about the Z-axis is well known. With this type of electric discharge machine, a rotary encoder having a high resolution of, for example, 360,000 divisions, is attached to a servo motor which causes the spindle to rotate. Being able to index the rotational angle of the spindle in this way is known as C-axis control. In order to lock the indexable spindle, a locking device equipped with a brake disk which produces a strong braking force has conventionally been used.

A conventional locking device for locking an indexable spindle will now be described with reference to FIG. 5.

A spindle 1 having a tool electrode held at its lower end is contained inside a housing 3. A thin brake disk 51 having a slight flexibility at an outer edge is fixed to the spindle 1. A fixed frame 52, in which a few brake shoes 54 are spaced equidistantly about the spindle 1, is fixed to the housing 3. A number of cylinder members 53 forming cylinder chambers 53a are fixed to the frame 52. Pistons 55 and springs 56 for resiliently retracting the pistons are respectively housed in the cylinder chambers 53a. Brake shoes 55a are attached to tips of the pistons 55 so as to face the brake shoes 54. Connecting pipes 57 leading to the cylinder chambers 53a are attached to the cylinder members 53. As shown on the right hand side of FIG. 5, if compressed air is supplied to a cylinder chamber 53a through a connecting pipe 57, the piston 55 is advanced and the brake disk 51 is pressed against the brake shoe 54 by the brake shoe 55a. As a result, the brake disk 51 is locked between the brake shoes 55a and 54. At this time, the outer edge of the brake disk 51 bends downwards. As shown on the left hand side of FIG. 5, if the supply of compressed air is stopped the piston 55 retreats, and very small space is formed between the brake shoes 55a and 54 and the brake disk 51.

In this way, when the brake disk 51 is locked between the brake shoes 55a and 54, the outer edge of the brake disk 51 is bent. If this deformation is carried out repeatedly the outer edge of the brake disk 51 becomes set in the deformed state so that it undulates unevenly. As a result of this, there is force in a direction causing rotation of the brake disk 51 derived from pressing against the brake disk 51. The spindle 1 then becomes locked at an incorrect rotation angle due to this component of force.

SUMMARY OF THE INVENTION

An object of the present invention is to provide a locking device for accurately locking a spindle at a desired, rotational angle, even if it has been used over a long period of time.

Additional objects, advantages and novel features of the invention will be set forth in the description that follows, and will become apparent to those skilled in the art upon reading this description or practicing the invention. The objects and advantages of the invention may be realized and attained by practicing the invention as recited in the appended claims.

According to the present invention, there is provided a locking device for an indexable spindle to which a tool electrode is attached, comprising a brake disk fixed to the spindle, an upper brake member movable in the axial direction of the spindle between a first position and a second position closer to the brake disk than the first position, a lower brake member movable in the axial direction of the spindle between a third position and a fourth position closer to the brake disk than the third position, an upper disk arranged facing upper surface of the brake disk across a minimum gap when the upper brake member is at the first position, a lower disk arranged facing lower surface of the brake disk across a minimum gap when the lower brake member is at the third position, and drive means for moving the upper and lower brake members in the axial direction of the spindle. When the upper brake member is at the second position and the lower r brake member is at the fourth position, the upper and lower brake members press the upper and lower disks against the brake disk to lock the spindle.

BRIEF DESCRIPTION OF THE DRAWINGS

The accompanying drawings, which are incorporated in and form a part of the specification, illustrate an embodiment of the present invention, and together with the description serve to explain the principles of the invention. In the drawings:

FIG. 1 is a structural drawing illustrating a spindle head of an electric discharge machine adopting the locking device of the present invention;

PREFERRED EMBODIMENT OF THE INVENTION

Figure 2:
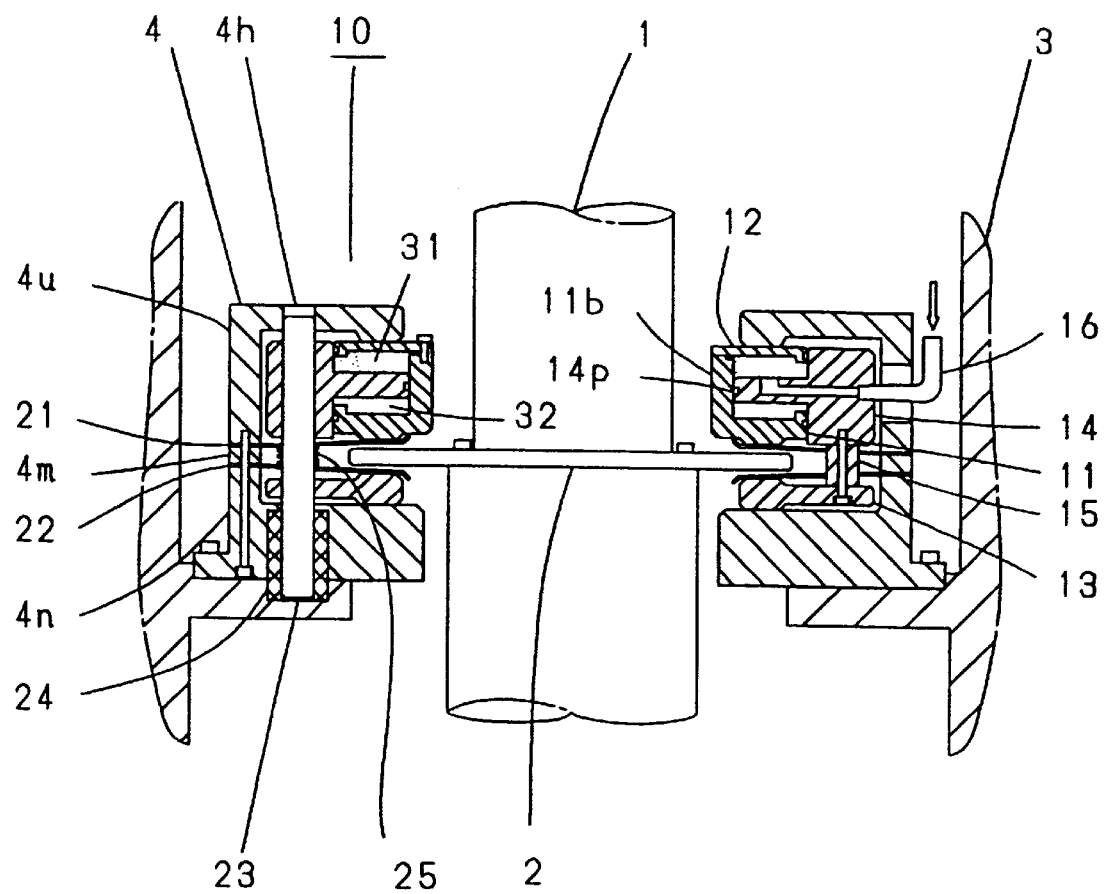
FIG. 2 is a partial cross sectional drawing illustrating t he locking device when the indexable spindle of FIG. 1 is being locked.

A spindle head of an electric discharge machine adopting the locking device of the present invention will now be described with reference to the non-limiting example of FIG. 1.

A chuck 71 for holding a tool electrode is attached to a lower end of a spindle 1. The spindle 1 is rotatably held by a bearing 72 fixed to a spindle head housing; the spindle being connected at its upper end to a servo motor 74 by a coupling 73. The servo motor 74 is controlled so as to either rotate the spindle 1 at high speed or accurately divide the rotation angle of the spindle 1, as required. A locking device 10 is open when the servo motor 74 rotates the spindle 1 at high speed. A chuck drive assembly 75 operates the chuck 71 to open or close. A power feed device 77 feeds electrical power pulses to the tool electrode through the spindle 1. A dielectric supply device 78 supplies dielectric fluid to the tool electrode through the spindle 1.

Figure 3:
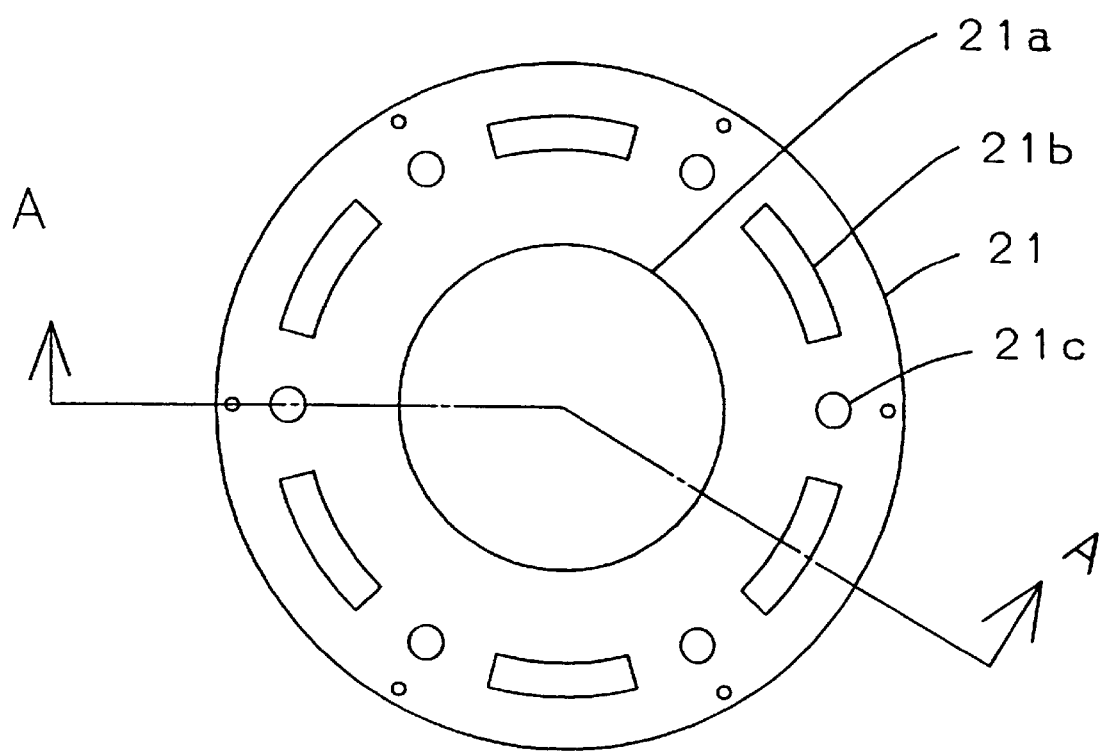
FIG. 3 is a plan view illustrating a disk of the locking device.
Figure 4:
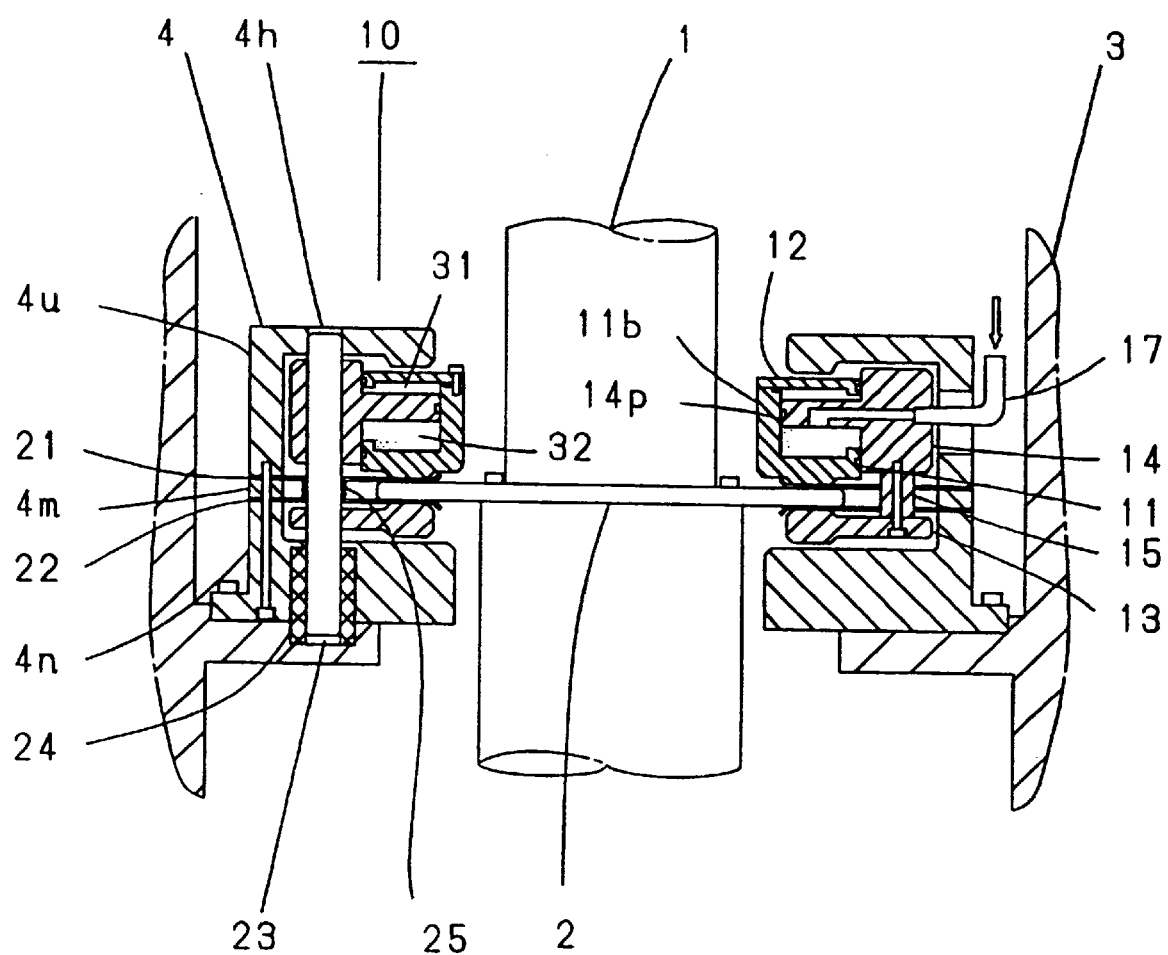
FIG. 4 is a partial cross sectional view illustrating the locking device when the indexable spindle of FIG. 1 is free.
Figure 5:
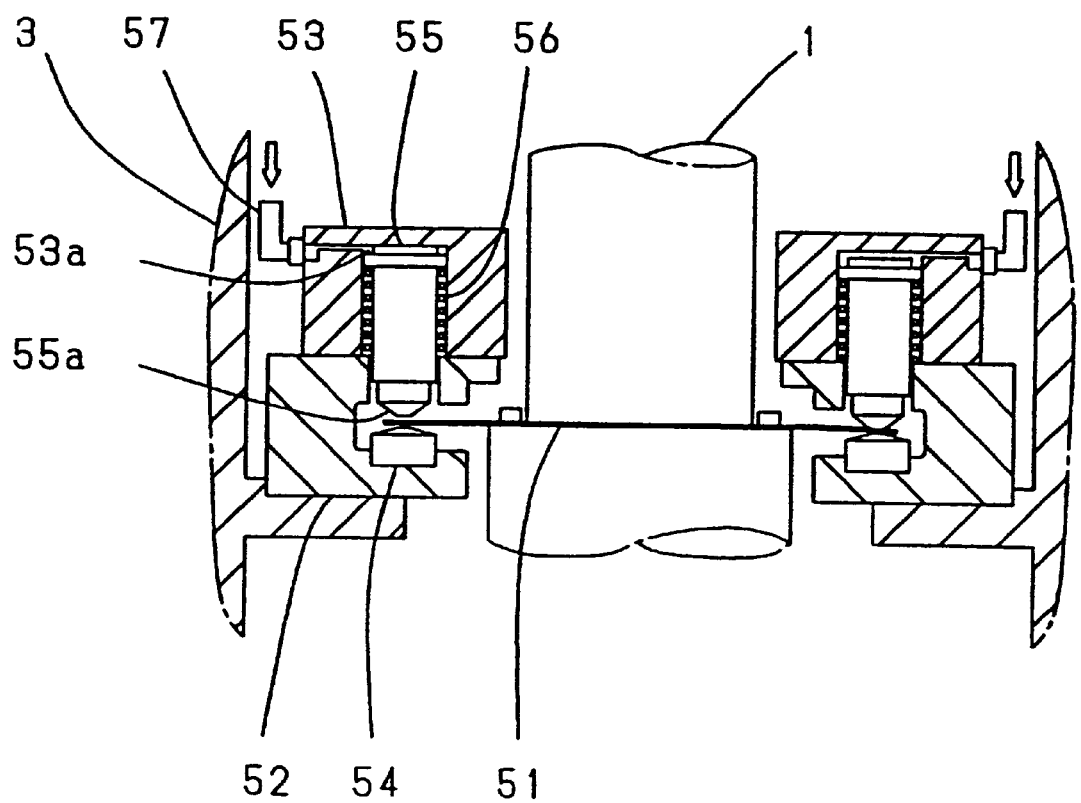
FIG. 5 is a partial cross sectional view illustrating a conventional locking device for an indexable spindle.

An example of a locking device 10 in accordance with the invention will now be described in detail with reference to FIG. 2 to FIG. 4. The illustrated locking device 10 is provided in a compact manner between a housing 3 of a spindle head and a spindle 1. A brake disk 2 of the locking device 10 is integrally fixed to the spindle 1. The brake disk 2 is formed of a rigid disk that strongly resists deformation. An upper disk 21 and a lower disk 22 are arranged respectively facing upper and lower surfaces of the rigid brake disk 2. A frame 4 of the locking device 10 is fixed to the housing 3, and comprises an upper frame 4u, a middle frame 4m and a lower frame 4n. The upper disk 21 is fixed at its outer edge between the upper frame 4u and the middle frame 4m. The lower disk 22 is fixed at its outer edge between the middle frame 4m and the lower frame 4n. In the lower frame 4n, linear motion bearings 24 are spaced equidistantly about the spindle 1. Guide pins 23 are held in the lower frame 4n using the linear motion bearings 24 so as to be slidable in the vertical direction. The upper frame 4u has through holes 4h into which the guide pins 23 are inserted. Appropriate linear motion bearings can be fitted into the through holes 4h of the upper frame 4u. Resilient members 25, such as compression coil springs, are fitted around the guide pins 23 between the upper and lower disks 21 and 22. These compression coil springs 25 respectively apply resilient force biasing the upper and lower disks 21 and 22 apart in the axial direction of the spindle 1. An annular cylinder member 14 into which the guide pins 23 are inserted is provided on an upper side of the disk 21, and an annular lower brake member 13 into which the guide pins 23 are inserted is provided on a lower side of the disk 22. The annular cylinder member 14 and the annular lower brake member 13 are connected by connecting members 15. Though the annular member 14 and the lower brake member 13 can move in the axial direction of the spindle 1, they are fixed in the horizontal direction by the guide pins 23. As shown in the example of FIG. 3, the upper disk 21 has a hole 21a through which the spindle 1 passes, six holes 21b into which the connecting members 15 are loosely fitted, and six holes 21c into which the guide pins 23 are loosely fitted, and six holes 21c into which the guide pins 23 are loosely fitted. The lower disk 22 is preferably formed in the same shape as the upper disk 21, and the upper and lower disks 21 and 22 are arranged symmetrically about the brake disk 2. The upper and lower disks 21 and 22 are preferably formed as thin resilient bodies, which will tend to bend or deform when pressed against from one side. An annular upper brake member 11 is inlaid inside the annular cylinder member 14 so as to be capable of sliding in the vertical direction. The brake members 11 and 13 have annular projections respectively extending towards the disks 21 and 22. These annular projections oppose each other on either side of the brake disk 2; each projection having a tip portion formed generally flat so as to come into uniform contact with the disks 21 and 22 respectively. An annular cap 12 is attached at its inner edge to the upper end of vertical wall 11b of the upper brake member 11. The outer edges of the cap 12 and the upper brake member 11 are connected by seal rings to inner surface of the cylinder member 14 so as to be capable of rising and falling. In this way, the cylinder member 14, the upper brake member 11 and the cap 12 form an annular chamber. The cylinder member 14 has a partitioning section 14p which extends horizontally towards the spindle 1 and which comes into contact with wall 11b of the upper brake member 11 using a seal ring. The partitioning section 14p constitutes an annular piston guided by the wall 11b, and the chamber is divided into a upper cylinder chamber 31 and a lower cylinder chamber 32 by the partitioning section 14p.

Compressed air is selectively supplied to the cylinder chambers 31 and 32 in order to either lock or unlock the brake disk 2. As shown in the right hand side of FIG. 4, compressed air for locking the brake disk 2 is supplied to the cylinder chamber 32 through a connecting pipe 17 and a supply hole formed inside the cylinder member 14. The upper brake member 11 is moved downwards, separating from the upper frame 4u, and the lower brake member 13 is moved upwards, separating from the lower frame 4n by means of the compressed air inside the cylinder chamber 32. As shown in FIG. 4, the upper and lower brake members 11 and 13 press the upper and lower disks 21 and 22 against the brake disk 2 against the resilient force of the compression coil springs 25. As depicted in the exemplary embodiment of FIG. 4, the upper and lower brake members 11 and 13 respectively press the upper and lower disks 21 and 22 against the brake disk 2 against the resilient bias force of the compression coil springs 25. In this way, the brake disk 2 is held between the upper and lower disks 21 and 22 that are pressed by the upper and lower brake members 11 and 13. As shown in the right hand side of FIG. 2, compressed air for releasing the brake disk 2 is supplied to the cylinder chamber 31 through another connecting pipe 16 and another supply hole formed inside the cylinder member 14. The upper and lower brake members 11 and 13 are moved away from the brake disk 2 by the compressed air inside the cylinder chamber 31. The upper frame 4u restricts upward movement of the cap 12; or in other words, upward movement of the brake member 11 so that a minimum gap is maintained between the brake disk 2 and the disk 21. Similarly, the lower frame 4n restricts downward movement of the brake member 13 so as to maintain essentially the same minimum gap between the brake disk 2 and the disk 22. Thus, the upper and lower frames 4u and 4n are positioned so that the upper and lower disks 21 and 22 uniformly press against the brake disk 2. FIG. 2 is a cross sectional drawing along line A—A in FIG. 3, while FIG. 4 is a cross sectional drawing along line A—A in FIG. 3.

According to the locking device of the present invention, the pressing force against the brake disk 2 acts on its upper surface and the lower surface uniformly and simultaneously in a vertical direction, which makes it possible to accurately index the rotation angle of the brake disk. Additionally, the brake disk 2 strongly resists deformation, even if repeatedly subjected to pressing forces. As a result, the accuracy of indexing the rotation angle of the brake disk 2 is maintained, even as the brake disk 2 ages.

The foregoing description of preferred embodiments of the invention have been presented for the purposes of illustration and description. It is not intended to be exhaustive or to limit the invention to the precise form disclosed, and obviously various modifications and variations are possible in light of the above teachings. It is intended that the scope of the invention be defined by the appended claims

What is claimed is:

1. A locking device for accurately locking an indexable, rotatable spindle to a desired rotational angle, comprising:
   a brake disc fixed to the spindle;
   a non-rotatable frame surrounding the brake disc;
   an upper disc having a first portion fixed to the frame opposite to an upper surface of the brake disc, wherein said first portion is non-movable relative to the frame;
   a upper brake member through which the spindle passes, the upper brake member being movable in the axial direction of the spindle between an unlock position and a lock position, the lock position being closer to the brake disc than the unlock position;
   a lower disc having a second portion fixed to the frame opposite a lower surface of the brake disc, wherein said second portion is non-movable relative to the frame;

a lower brake member through which the spindle passes, the lower brake member being movable in the axial direction of the spindle between an unlock position and a lock position, the lock position being closer to the brake disc than the unlock position;

drive means for moving the upper and lower brake members in the axial direction of the spindle;

wherein the upper and lower brake members press the upper and lower discs against the brake disc when the upper and lower brake members are at their lock positions, and the upper and lower discs oppose the upper and lower surfaces of the brake disc across respective gaps when the upper and lower brake members are at their unlock positions.

2. The locking device according to claim 1, wherein said upper and lower brake members are annular and generally coaxially disposed with respect to the spindle.

3. The locking device according to claims 1, further comprising a resilient member for applying a resilient force in the axial direction of the spindle so as to tend to separate the upper and lower discs.

4. The locking device according to claim 1, wherein the upper and lower discs are fixed to the frame at their outer edges.

5. The locking device according to claim 1, wherein the frame defines the unlock positions of the upper and lower brake members.

6. The locking device according to claim 1, further comprising guide pins held in the frame for guiding the upper and lower brake members in the axial direction of the spindle.

7. The locking device according to claim 6, wherein the guide pins are spaced equidistantly about the spindle.

8. The locking device according to claim 6, wherein the guide pins pass through the upper and lower discs, and further comprising springs which are fitted around the guide pins, respectively, between the upper and lower discs.

9. The locking device according to claim 1,wherein said gaps are at a minimum when the upper and lower brake members are in their unlock positions.

10. The locking device according to claim 1, wherein said brake disc comprises a rigid disk.

11. The locking device according to claim 1, wherein both the upper and lower disc include an opening through which the spindle passes, said first portion and second portion defining an outer part of said upper disc and lower disc, respectively, wherein the upper and lower brake members press an inner part of the upper and lower disc, respectively, against the brake disc when the upper and lower brake members are at their lock positions.

* * * * *